No. 828,639. PATENTED AUG. 14, 1906.
J. B. CLARK.
COTTON CHOPPER.
APPLICATION FILED AUG. 5, 1905.
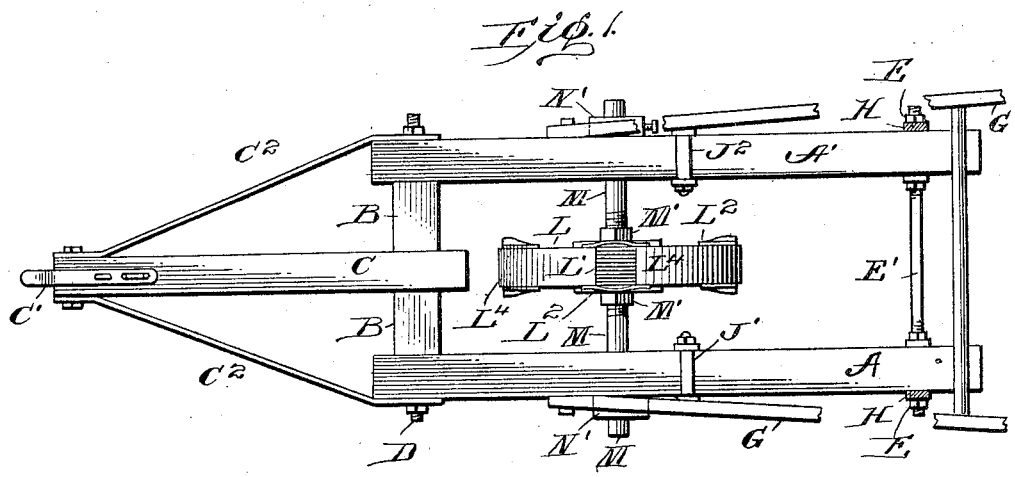
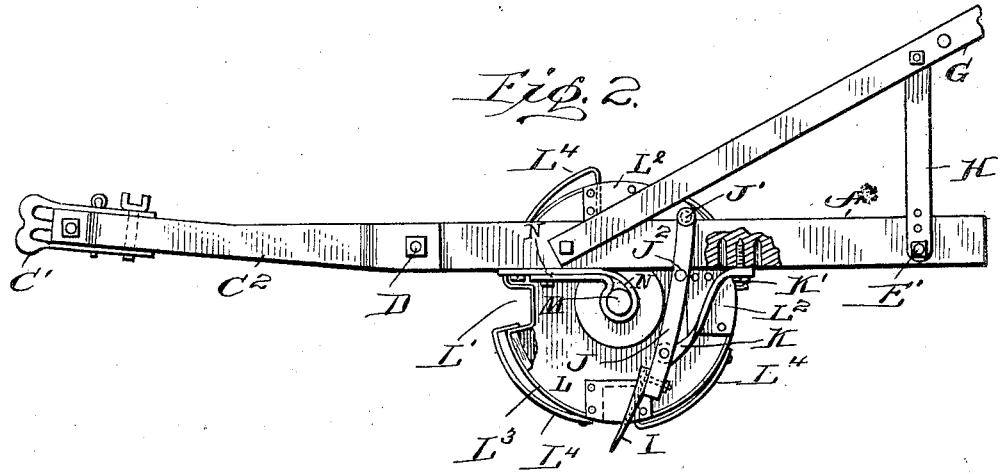

UNITED STATES PATENT OFFICE.

JOHN B. CLARK, OF FARMERVILLE, LOUISIANA.

COTTON-CHOPPER.

No. 828,639.

Specification of Letters Patent.

Patented Aug. 14, 1906.

Application filed August 5, 1905. Serial No. 272,869.

*To all whom it may concern:*

Be it known that I, JOHN B. CLARK, a citizen of the United States, residing at Farmerville, in the parish of Union and State of Louisiana, have invented new and useful Improvements in Cotton-Choppers, of which the following is a specification.

Although numerous cotton-choppers have been devised, the work is still usually done by hand. The planter requires a device that is inexpensive, simple, not readily injured by striking a root or a stone, readily repaired if injured, capable of withstanding careless usage, and that permits the operator to instantly vary the point at which a plant or cluster of plants shall be left, so that in case there is no plant at the usual point, the nearest plant may be left, whereby a slight gap in the original line of plants will not cause any diminution in the number of hills or stands of cotton. To meet these requirements, I provide a short cylinder or wheel having peripheral pockets at regular intervals and arrange plows upon each side of the lowest point of the wheel to throw the earth toward it. The pockets protect plants at intervals while the broad rim of the wheel stamps the intermediate plants into the earth, and the plows instantly cover them, all being done in cultivating the cotton instead of by running over the whole field with a device which merely chops out the plants which are not desired.

In the accompanying drawings, Figure 1 is a plan view of the apparatus, a small portion being broken away to show construction. Fig. 2 is a side elevation of the same devices, parts being broken away for the same purpose as in Fig. 1.

In the views I have shown a wood frame made up of two plow-beams A A', separated at their front ends by blocks B and a short tongue C, all being bound together by a bolt-rod D that forms a pivot for the tongue.
The latter is provided with the usual clevis C' and with flat oblique braces C², connected at their rear ends to the rod D and serving also as fenders, preventing the beams from catching upon anything while the apparatus is advancing. The rear ends of the beams are adjustably held between nuts E upon a threaded bolt E', whereby the distance between the plows may be varied at will. Handles G are pivoted to the beams, respectively, and are supported at any desired height by bars H, made adjustable in effective length and pivotally connected to the handles and to the cross rod or bolt E'. The plows are ordinary shovel-plates I, bolted to stocks J, formed by doubling a metal bar in the middle and clamping its branches to the beam which lies between them by bolts J' J² above and below the beam, respectively. The stock is braced by an oblique bar K, whose rear end is adjustably fixed to the beam in any suitable manner, as by a lag-bolt K' entering one of several bolt-holes. By moving this bolt while the bolts J' J² are loosened, the plows may be moved forward or rearward, and by merely loosening the bolts J' J² while this bolt is unmoved, the angle of the plows may be adjusted. Midway between the plows is a short cylinder or solid wheel L, whose periphery is cut away at intervals to form equally-spaced pockets L', which are laterally closed by thin outwardly-bulging steel plates L², detachably secured to the end walls of the cylinder. As shown, the wheel is made hollow, and around its periphery passes a metal tire-like band L³, which bends into each pocket-space and forms the bottom and two side walls of the pocket. The cylinder is detachably and adjustably fixed upon a suitably-threaded shaft M by means of nuts M', and the shaft is removably mounted in bearings N upon the plow-beams and held against longitudinal displacement by collars N', secured in place by set-screws.

Flat springs L⁴ are fixed at one end to the periphery of the wheel, and each has its free end bent into the corresponding pocket, but not extending to the bottom thereof. This end lies contiguous to one wall of the pocket, and the body of the spring normally stands out from the rim of the wheel. All the springs are pressed inward to the rim as the wheel rotates, for each in succession bears the weight of the machine. Each springs again outward to normal position as soon as the weight is removed, and the inbent end in moving out tends to dislodge any soil that might otherwise remain in the pocket. The springs would not loosen mud, perhaps, but the apparatus is not used except when the soil is not muddy, but in proper condition, and hence it is found that practically the springs work satisfactorily.

In use the apparatus is so placed that the central plane of the wheel-rim coincides with a row of cotton-plants, and the machine is then drawn forward, the entire weight of the apparatus, except the small part that is carried by the plows, resting upon the wheel. As the wheel rolls forward certain plants are covered and temporarily protected in the pockets, while all the others are rolled into the earth by the broad rim and are instantly covered as the wheel leaves them by the inwardly-falling earth, which the plows constantly throw against opposite ends of the wheel or cylinder. The protected plants are thus left in an erect position with the earth hilled up about them, but left concave immediately about those plants. Thus in cultivating the crop, all the plants not wanted are crushed down and covered before any of them again rise, and hence are effectually smothered and destroyed. If, as often happens, the operator notices that plants are missing at a point where a pocket should protect them, he lifts the devices at the proper time and lowers them, so that the pocket may protect the nearest plants in advance or in the rear of the normal position, where they should be left, thereby preventing the loss of one hill.

It may be noted that there is no rapidly-moving part to be injured in striking an immovable object, and, further, that in case any of the steel plates should be injured the particular plate can be quickly removed and restored to place or be replaced by another.

What I claim is—

1. The combination with a frame and frame-supporting cylinder provided with peripheral pockets to protect certain plants while others are crushed into the earth by the wheel, of plows arranged to throw earth against the opposite ends of the cylinder, respectively, as the machine advances; whereby the earth thrown against the ends of the cylinder falls upon the crushed plants the instant the cylindrical surface leaves any portion of the same.

2. The combination with the wheel having peripheral pockets of the flat springs secured upon the periphery of the wheel following along the same while gradually departing therefrom, and having their free ends bent inward along the walls of the pockets, respectively.

In testimony whereof I affix my signature in presence of two subscribing witnesses.

JOHN B. CLARK.

Witnesses:
  J. W. ELDERS,
  E. L. RAMSEY.